United States Patent
Kembaiyan

[11] Patent Number: 5,527,113
[45] Date of Patent: Jun. 18, 1996

[54] ROCK BIT BEARING MATERIAL

[75] Inventor: K. T. Kembaiyan, The Woodlands, Tex.

[73] Assignee: Smith International, Inc., Houston, Tex.

[21] Appl. No.: 449,565

[22] Filed: May 24, 1995

Related U.S. Application Data

[63] Continuation of Ser. No. 108,043, Aug. 16, 1993, abandoned.

[51] Int. Cl.⁶ ............................................. F16C 33/06
[52] U.S. Cl. ..................................... 384/93; 384/912
[58] Field of Search .......................... 384/93, 92, 95, 384/96, 912

[56] References Cited

U.S. PATENT DOCUMENTS

| | | |
|---|---|---|
| 1,928,747 | 10/1933 | Wise . |
| 3,674,575 | 7/1972 | Prill et al. . |
| 3,721,307 | 3/1973 | Mayo . |
| 3,937,638 | 2/1976 | Plewes . |
| 3,995,917 | 12/1976 | Quinlan . |
| 4,012,238 | 3/1977 | Scales . |
| 4,052,204 | 10/1977 | Plewes . |
| 4,090,890 | 5/1978 | Plewes . |
| 4,105,263 | 8/1978 | Sorensen et al. . |
| 4,142,918 | 5/1979 | Plewes . |
| 4,169,730 | 10/1979 | Matthews et al. . |
| 4,260,432 | 4/1981 | Plewes . |
| 4,298,553 | 11/1981 | Ayers . |
| 4,641,976 | 2/1987 | Kar . |

FOREIGN PATENT DOCUMENTS

| | | |
|---|---|---|
| 586210 | 3/1947 | United Kingdom . |
| 1000651 | 8/1965 | United Kingdom . |
| 1307650 | 2/1973 | United Kingdom . |

OTHER PUBLICATIONS

"Pfinodal, The Cost Saving High Performance Copper Alloy Strip" (1988, Ametek, Specialty Metal Products Division, Wallingford, Connecticut), Form 4M288.

"Pfinodal, The Cost Saving High Performance Copper Alloy Strip, Technical Data" (1988, Ametek, Specialty Metal Products Division, Wallingford, Connecticut), form 3M88F.

Primary Examiner—Lenard A. Footland
Attorney, Agent, or Firm—Christie, Parker & Hale

[57] ABSTRACT

The use of a sintered compact of a copper base alloy, a transition metal, a metalloid and a strengthener for bearing surfaces formed between roller cutter cones of sealed bearing rock bits.

22 Claims, 4 Drawing Sheets

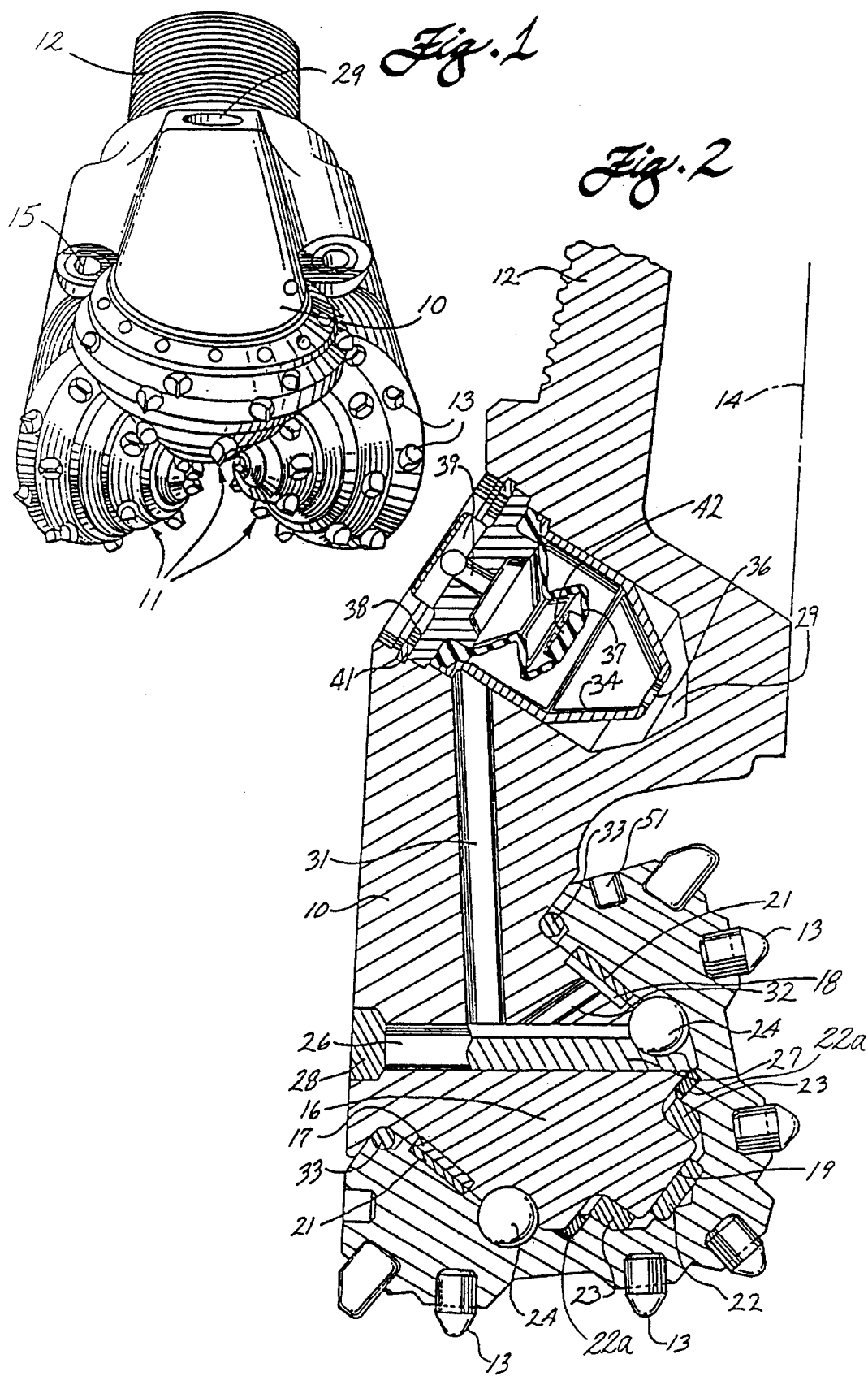

ROCK BIT BEARING MATERIAL

CROSS-REFERENCE TO RELATED APPLICATION

This is a continuation of application Ser. No. 08/108,043, filed Aug. 16, 1993, abandoned.

FIELD OF THE INVENTION

This invention relates to a bearing material and more particularly to a bearing material for rotary cone rock bits for drilling oil wells or the like.

BACKGROUND OF THE INVENTION

Heavy-duty rock bits are employed for drilling wells in subterranean formations for oil, gas, geothermal steam, and the like. Such bits have a body connected to a drill string and a plurality, typically three, of hollow cutter cones mounted on the body for drilling rock formations. The cutter cones are mounted on steel journals or pins integral with the bit body at its lower end. In use, the drill string and bit body are rotated in the bore hole, and each cone is caused to rotate on its respective journal as the cone contacts the bottom of the bore hole being drilled.

While such a rock bit is used in hard, tough formations, high pressures and temperatures are encountered. The total useful life of a rock bit in such severe environments is on the order of 20 to 200 hours for bits in sizes of about 6 to 28 inch diameter at depths of about 5,000 to 20,000 feet. Useful lifetimes of about 65 to 150 hours are typical.

When a rock bit wears out or fails as a bore hole is being drilled, it is necessary to withdraw the drill string for replacing the bit. Prolonging the time of drilling minimizes the lost time in "round tripping" the drill string for replacing bits.

Replacement of a drill bit can be required for a number of reasons, including wearing out or breakage of the structure contacting the rock formation. One reason for replacing the rock bits includes failure or severe wear of the journal bearings on which the cutter cones are mounted. The journal bearings are subjected to very high pressure drilling loads, high hydrostatic pressures in the hole being drilled, and high temperatures due to drilling, as well as elevated temperatures in the formation being drilled. Considerable development work has been conducted over the years to produce improved bearing structures and bearing materials that minimize wear and failure of such bearings.

A variety of bearing compositions have been employed in the past. Bearing compositions which have been used include cast or wrought forms of copper-based spinodal composites such as disclosed in U.S. Pat. No. 4,641,976, the disclosure of which is expressly incorporated herein by reference. These bearing compositions comprise ternary alloys of copper with nickel and tin but may contain other metals to further improve the metallurgical properties.

In order to further enhance properties of bearing material various additions to alloys have been proposed. However, some elements otherwise desirable for addition to improve properties are insoluble or only slightly soluble in copper solid solution and will form compounds that segregate during melting and subsequent thermomechanical processing. Metalloids such as Sb, As, S, Sn, Se, Te, Be, P, etc., are examples of elements having, at best, limited solid solubility in copper but which form stable compounds that would usefully improve strength and toughness of a copper alloy matrix through a combination of several of the phase transformations such as solid solution strengthening, precipitation hardening and spinodal decomposition. However, these metalloidic elements are highly surface active in a copper matrix and tend to segregate at the high energy areas such as grain boundaries, dislocations and other crystal defects.

In view of the foregoing, it is evident that it is desirable to provide a bearing material for rock bits that is less susceptible to premature wear or failure during service at the high temperatures, bearing pressures and rotational speeds often found in modern rock bits that combines high strength and other desirable metallurgical properties through a combination of several phase transformations such as solid solution strengthening, precipitation hardening and spinodal composition without undesirable segregation of ingredients.

SUMMARY OF THE INVENTION

The present invention provides a bearing material for a rock bit which comprises a sintered powder mixture, i.e. compact, of a copper base alloy and one or more other metals of limited solid solubility that avoids the problems of segregation during solidification and thermomechanical processing. Since the bearing material is made by sintering a powder mixture, segregation that results from solidification after melting is avoided. Thus, alloying ingredients that would segregate upon casting may be used. Furthermore, sintered compacts of a hardness suitable for bearing applications, e.g. HRc 30 to 40 or equivalent, are obtained.

Bearing components can also be manufactured by extrusion or a strip or plate forming, i.e. rolling, process which is more cost-effective as compared to conventional machining processes. Moreover, such processes also impart an amount of cold work into the compound which results in grain refinement and higher strength. Strip or plate can additionally be formed into bearing components such as sleeves or stamped to produce thrust washers. Similarly, spindle caps and sleeves, as well as other bearing components, can also be made by extrusion. Costly machining operations can be minimized or eliminated by forming the sintered compact into bearing components.

In accordance with the practice of the invention a bearing material for a rock bit is provided which comprises a sintered powder mixture comprising a copper base alloy with about 5–20 wt. % of a transition metal soluble in copper and in solid solution therewith, such as Fe, Co, Ni and Cr, and about 0.5–10 wt. % of at least one metalloid such as Sn, Se, Te, Be, P, Sb, As, S, etc., which has limited solid solubility in copper and forms a stable compound with the transition metal or copper that is substantially insoluble in solid solution with copper. Advantageously, about 0.1–0.8 wt. % of at least one strengthening agent may be added from the group consisting of Zr, Mo, Nb and Al, the amount of strengthening agent not exceeding about 5 wt. % of the sintered powder mixture.

Bearing components that may be made in sintered form in accordance with the invention include sleeves, thrust washers and spindle caps in rock bits such as are described herein.

BRIEF DESCRIPTION OF THE DRAWINGS

A rock bit with such a bearing material is illustrated in semi-schematic perspective in FIG. 1 and in a partial cross-section in FIG. 2.

FIG. 3 is a microstructure of cast spinodal alloy (Cu-15Ni-8Sn) at 200X;

FIG. 4 is a microstructure of a cast spinodal alloy with second-phase segregation reduced by heat treatment, at 200X;

FIG. 5 is a microstructure of a powder metallurgically produced spinodal alloy (Cu-15Ni-8Sn) at 200X;

FIG. 6 is a microstructure of cast spinodal alloy of FIG. 3 at 500X; and

FIG. 7 is a microstructure of powder metallurgically produced spinodal alloy (Cu-15Ni-8Sn) of FIG. 5 at 750X.

DETAILED DESCRIPTION

Figure 3:
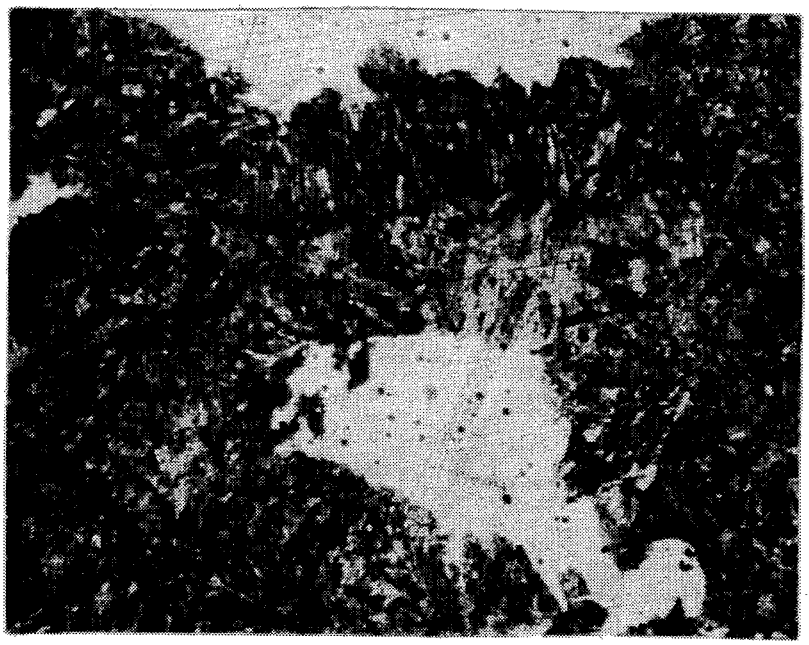
FIG. 3–7 are photomicrographs illustrating the differences in microstructures of alloy compositions, as follows.
Figure 4:
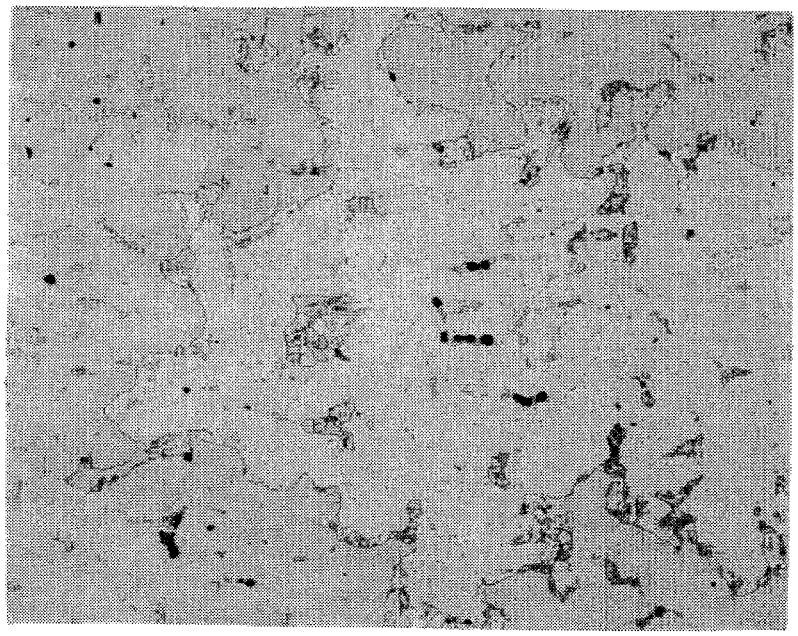
Figure 5:
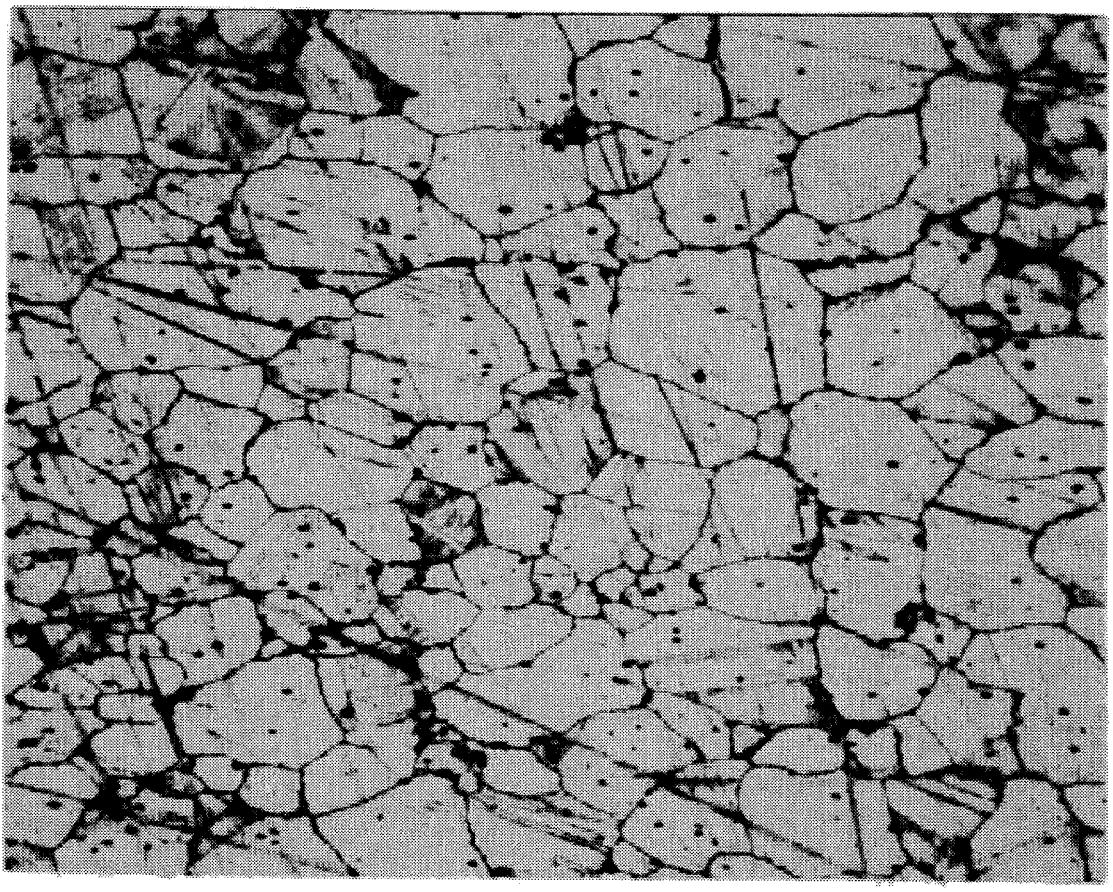

A rock bit employing a sintered powder compact, i.e. sintered powder mixture, as a bearing material comprises a body 10 having three cutter cones 11 mounted on its lower end. A threaded pin 12 is at the upper end of the body for assembly of the rock bit onto a drill string for drilling oil wells or the like. A plurality of tungsten carbide inserts 13 are pressed into holes in the surfaces of the cutter cones for bearing on the rock formation being drilled. Nozzles 15 in the bit body introduce drilling mud into the space around the cutter cones for cooling and carrying away formation chips drilled by the bit.

FIG. 2 is a fragmentary, longitudinal cross section of the rock bit, extending radially from the rotational axis 14 of the rock bit through one of the three legs on which the cutter cones 11 are mounted. Each leg includes a journal pin 16 extending downward and radially inward on the rock bit body. The journal pin includes a cylindrical bearing surface having a hard metal insert 17 on a lower portion of the journal pin. An open groove 18 is provided on the upper portion of the journal pin. Such a groove may, for example, extend around 60% or so of the circumference of the journal pin, and the hard metal 17 can extend around the remaining 40% or so. The journal pin also has a cylindrical nose 19 at its lower end.

Each cutter cone 11 is in the form of a hollow, generally-conical steel body having tungsten carbide inserts 13 pressed into holes on the external surface. For long life, the inserts may be tipped with a polycrystalline diamond layer. Such tungsten carbide inserts provide the drilling action by engaging a subterranean rock formation as the rock bit is rotated. Some types of bits have hard-faced steel teeth milled on the outside of the cone instead of carbide inserts.

The cavity in the cone contains a cylindrical bearing surface including an insert 21 in the form of a sintered compact which is metallurgically bonded within the groove in the steel of the cone or as a floating insert in a groove in the cone. The sintered compact insert 21 in the cone engages the hard metal insert 17 on the leg and provides the main bearing surface for the cone on the bit body. The sintered powder material in compact form provides a good bearing surface that is both tough and ductile to enhance the longevity of the rock bit as it works in a bore hole. The sintered compact bearing surface runs against the journal bearing. The rock bit as it works in a bore hole exerts pressure to the loaded side of the journal, thus contacting the sintered bearing bonded to the cone against the hard metal surface 17.

A nose button 22 is between the end of the cavity in the cone and the nose 19 and carries the principal thrust loads of the cone on the journal pin and a thrust washer 22a, similar to 22, may be provided. A bushing 23 surrounds the nose and provides additional bearing surface between the cone and journal pin.

The nose button 22 and bushing 23 could be made as a single piece, i.e., as a spindle cap.

Other types of bits, particularly for higher rotational speed applications, have roller bearings instead of the exemplary journal bearings illustrated herein.

A plurality of bearing balls 24 are fitted into complementary ball races in the cone and on the journal pin. These balls are inserted through a ball passage 26, which extends through the journal pin between the bearing races and the exterior of the rock bit. A cone is first fitted on the journal pin, and then the bearing balls 24 are inserted through the ball passage. The balls carry any thrust loads tending to remove the cone from the journal pin and thereby retain the cone on the journal pin. The balls are retained in the races by a ball retainer 27 inserted through the ball passage 26 after the balls are in place. A plug 28 is then welded into the end of the ball passage to keep the ball retainer in place.

The bearing surfaces between the journal pin and cone are lubricated by a grease composition. Preferably, the interior of the rock bit is evacuated, and grease is introduced through a fill passage (not shown). The grease thus fills the regions adjacent the bearing surfaces plus various passages and a grease reservoir. The grease reservoir comprises a cavity 29 in the rock bit body, which is connected to the ball passage 26 by a lubricant passage 31. Grease also fills the portion of the ball passage adjacent the ball retainer, the open groove 18 on the upper side of the journal pin, and a diagonally extending passage 32 therebetween. Grease is retained in the bearing structure by a resilient seal 33 between the cone and journal pin.

A pressure compensation subassembly is included in the grease reservoir 29. This subassembly comprises a metal cup 34 with an opening 36 at its inner end. A flexible rubber bellows 37 extends into the cup from its outer end. The bellows is held in place by a cap 38 with a vent passage 39. The pressure compensation subassembly is held in the grease reservoir by a snap ring 41.

When the rock bit is filled with grease, the bearings, the groove 18 on the journal pin, passages in the journal pin, the lubrication passage 31, and the grease reservoir on the outside of the bellows 37 are filled with grease. If the volume of grease expands due to heating, for example, the bellows 37 is compressed to provide additional volume in the sealed grease system, thereby preventing accumulation of excessive pressures. High pressure in the grease system can damage the seal 33 and permit abrasive drilling mud or the like to enter the bearings. Conversely, if the grease volume should contract, the bellows can expand to prevent low pressures in the sealed grease systems, which could cause flow of abrasive and/or corrosive substances past the seal.

As an illustration of the bearing material in accordance with the present invention for rock bits, a ternary copper-based alloy is prepared which is especially suitable for tri-cone rotary petroleum and mining bits. These alloys are in the form of Cu-M-X where:

"M" is a transition metal, such as Fe, Co, Ni, Cr, present in the range of about 5–20 wt. %, which is readily soluble in the copper matrix and forms a solid solution with copper; and "X" is a metalloid, such as Sb, As, S, Sn, Se, Te, Be, P, etc., present in the range of about 0.5–10 wt. % and which has a limited solid solubility in copper but forms stable compounds with the solute, i.e. the transition metal M and/or copper.

The compound forms may be described as $M_aX_b$, where a and b are stoichiometric coefficients, because of the thermodynamic interaction between the metalloid and the transition metal. These metalloidic elements are usually highly surface-active in a copper matrix and often tend to segregate at the high-energy areas such as grain boundaries, dislocations and other crystal defects.

It is also desirable to add one or more strengtheners from a group consisting of elements such as Zr, Mo, Nb and Al, in quantities of 0.1–0.8 wt. %, with the total addition of these strengtheners not exceeding 5 wt. % in the sintered mixture. These elements add high strength and other desirable properties for bearing applications, largely through a combination of one or several of the phase transformations such as solid solution strengthening, precipitation hardening and spinodal decomposition. Presently preferred compositions include 9–15 wt. % Ni and 5–10 wt. % Sn, balance substantially copper, to which up to 5 wt. % strengthener may be added.

The combined addition of M and X along with one or more elements selected from the group Zr, Mo, Nb and Al in small quantities of 0.1–0.8 wt. % with total addition of these (apart from M and X) not exceeding 5 wt. % in copper, is believed to render high strength and other desirable properties for bearing applications. Such desirable properties result either through precipitation hardening or spinodal decomposition in combination with solid solution strengthening. For example, the Cu-Be-Co alloys offer a combination of high strength and desirable tribological properties mainly through precipitation hardening. The Cu-Ni-Sn alloys derive an excellent combination of these properties through spinodal decomposition. Other notable copper alloys such as aluminum bronze, Invar and Cu-Mn-Se systems obtain their desirable properties through a combination of precipitation and solid solution strengthening. In general, the same or similar compositions available for bearing use in cast or wrought form can also be made by powder metallurgical techniques with substantially less segregation of limited-solubility components.

Because of the limited solid solubility of metalloidic elements, their segregation during solidification and subsequent thermoprocessing would be difficult to control if the composition were made according to standard casting practices, since significant segregation would occur during solidification and subsequent heat treatments. However, it has been discovered that if these alloys are processed using powder metallurgical techniques, the segregation of the metalloids can be eliminated or limited to acceptable levels and can be exploited to impart useful mechanical properties for bearing applications.

Bearing material in accordance with the invention is produced by powder metallurgical processing wherein a powder metal mixture of the components is provided in the prescribed proportions, hot-pressed and sintered or cold-pressed and sintered at sintering temperatures using standard sintering and pressing equipment known to industry. The resulting sintered compact can be rolled into a strip or plate of desired thickness and heat treated to the desired combination of strength and ductility and used in that form or further machined to suitable dimensions for use in rock bits. The powder metal mixture may be provided in any suitable form such as alloy powder made by melting, atomization and comminuting one or more pre-alloyed mixtures. Production of sintered compacts and metal strips is performed by Ametek, Specialty Metal Products Division, Wallingford, Conn.

Using powder metallurgy to produce sintered compacts of the bearing material described avoids the problem of adverse segregation of the metalloidic elements and sparingly soluble components. The beneficial strengthening effect of the metalloidic compound can be achieved without the undesirable effects of segregation.

It has been determined that to achieve a strength level (tensile stress) of 150 Ksi or greater, which is desirable for bearing properties, a copper alloy system should incorporate a combination of one or more basic elements such as nickel, manganese, chromium, iron, aluminum, etc. However, such ternary or tertiary solute additions, especially in combination with any metalloid, such as tin, beryllium, lead or selenium, would restrict the solubility of these elements in copper. For instance, although nickel is 100% soluble in copper, the binary copper-nickel alloys seldom possess the required strength. However, a minor addition of a metalloid such as tin in combination with nickel increases the strength of the alloy considerably through a spinodal decomposition. Unfortunately, any metalloidic addition in excess of its solubility limit results in an undesirable segregation of metalloid or its compound. In the Cu-15Ni-8Sn spinodal bearing alloy, the segregation of gamma phase, which is primarily a compound of tin, at the grain boundaries, decreases the strength and ductility of the alloy and limits its performance in the bearing applications.

The differences in the microstructures of an illustrated spinodal alloy composition (Cu-15Ni-8Sn) are shown in FIGS. 3–7. The microstructures of cast spinodal alloy in FIGS. 3 and 4 exhibit significant gamma segregation. The microstructure shown in FIG. 3 is unacceptable for bearing applications since the severe segregation at the grain boundaries and subsequent solute depletion in the matrix lowers the strength and ductility. The microstructure of the cast alloy in FIG. 4 exhibits relatively lower solute segregation due to the improvement in the heat treatment conditions. The segregation is completely eliminated in the powder metallurgically (PM) processed alloy shown in FIG. 5. All these three micrographs are at the same magnification for the sake of comparison. It is evident that the grain size of the PM alloy is much finer and more uniform than the cast alloys shown in FIGS. 3 and 4.

Figure 6:
Figure 7:
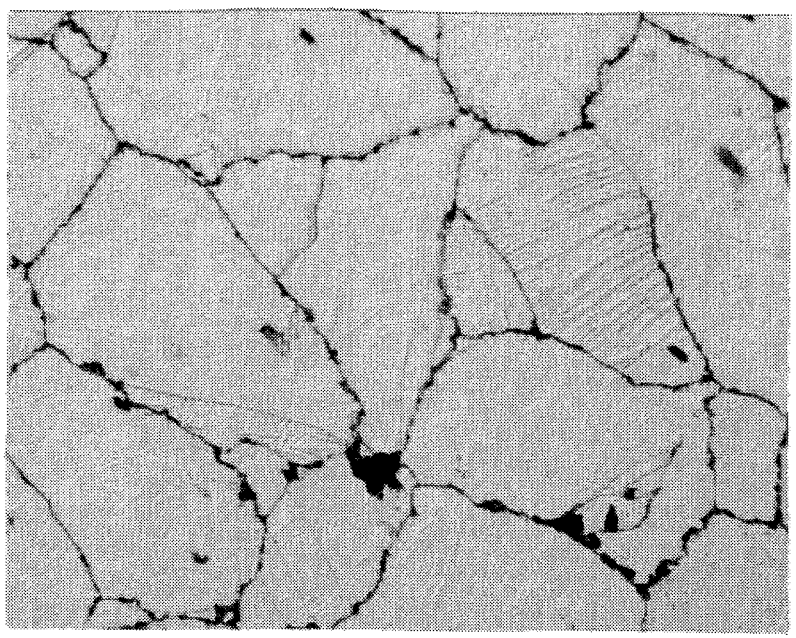

The advantages of powder metallurgical processing are further illustrated in the photomicrographs of FIGS. 6 and 7 at relatively higher magnifications. The microstructure of the cast alloy shown in FIG. 6 indicates severe segregation and coarser grains than that of the PM alloy shown in FIG. 7.

Additional advantages of the powder metallurgically produced bearing alloys and the strip forming methodology include:

(1) Efficient utilization of material (minimization of waste in machining and subsequent operations), which offers greater cost savings.

(2) Strip forming of bearing components avoids expensive machining operations and enables incorporation of a desired amount of cold work for higher strength and microstructural refinements.

(3) Improved product consistency; any slight variation in the standard heat treatment conditions (solution treatment, quenching and aging) results in a greater variation in the end product's properties. Thus, stringent heat treatment conditions are essential for maintaining the product consistency in the cast alloy but not in PM alloys. The PM alloys are produced from the individual powder's exact composition, thus product homogeneity is an inherent advantage in these alloys.

(4) PM alloys are adaptable for further improvement by alloying additions because they are not bound by the solubility limitations. With the addition of more nickel or metalloidic elements it is possible to enhance the strength of these alloys, or with molybdenum one could modify the coefficient of thermal expansion closer to that of steel, for example, for enhanced bearing performance in the drill bits. In the case of cast alloys, the solute addition beyond the solubility limits results in an adverse segregation problem, thereby limiting further alloy addition to improve properties. It is apparent from the foregoing that various changes and modifications may be made without departing from the invention. Accordingly, the invention should be limited only by the appended claims, wherein:

What is claimed is:

1. A rotary cone rock bit comprising:
   a rock bit body,
   at least one leg depending from said body,
   a journal shaft of said leg,
   a roller cutter cone adapted to be rotatively secured to said journal shaft, and
   a bearing material disposed between said journal and said roller cutter, said bearing material comprising a sintered powder compact, said sintered powder compact comprising:
   a copper base alloy,
   about 9–15 wt. % of a transition metal soluble in copper and forming a solid solution therewith, and
   about 5–10 wt. % of at least one metalloid of limited solid solubility in copper capable of forming a stable compound with the transition metal and/or with copper, which is substantially insoluble in solid solution with copper, and at least one strengthener from the group of Zr, Mo, Nb and Al in an amount not exceeding about 5 wt. % of the sintered compact.

2. A rotary cone rock bit according to claim 1 wherein said metalloid comprises at least one of Sn, Se, Te, Be, Sb, As, S and P.

3. A rotary cone rock bit as set forth in claim 1 wherein said sintered powder compact comprises copper-base spinodal alloys consisting essentially of copper-nickel-tin.

4. A rotary cone rock bit according to claim 1 having 0.1–0.8 wt. % of at least one of Zr, Mo, Nb and Al.

5. A rotary cone rock bit as set forth in claim 1 wherein said bearing material is formed in a cylindrical ring, said ring being interference fitted within a complementary cavity formed in said roller cutter, an inner surface of said cylindrical ring forming a bearing surface for said journal shaft.

6. A rotary cone rock bit as set forth in claim 5 wherein said journal shaft forms a circumferential groove in a surface formed by said shaft, said groove being transverse to an axis of said shaft, a portion of said groove being filled with a metal harder than the metal of said shaft, said hard metal portion acting as a bearing when said cone bearing surface is loaded against said hard metal surface during rock bit operation.

7. A rotary cone rock bit as set forth in claim 1 wherein said bearing material is secured to a support to provide bearing surfaces within said cone.

8. A rotary cone rock bit as set forth in claim 7 wherein said bearing material is metallurgically bonded within said cone to form bearing surfaces, said journal shaft forming a circumferential groove in a bearing surface formed by said shaft, said groove being transverse to an axis of said shaft, a portion of said groove being filled with a hard-facing metal, said hard-facing portion acting as a bearing when said cone bearing surface is loaded against said hard-facing surface during rock bit operation.

9. A rotary cone rock bit as set forth in claim 1 wherein said bearing material is formed as a cylindrical ring, said ring being so dimensioned to float between said journal shaft and said roller cutter, the inner and outer surfaces of said floating ring serve as bearing surfaces adjacent complementary bearing surfaces formed by said journal and said roller cutter.

10. A rotary cone rock bit as set forth in claim 9 wherein the inner bearing surface of said floating ring bears against said journal shaft, said shaft forming a circumferential groove in said shaft bearing surface, said groove being transverse to an axis of said shaft, a portion of said groove being filled with a metal harder than the metal of said shaft, said hard metal portion acting as a bearing when said roller cutter and said floating ring is loaded against said hard metal surface during rock bit operation.

11. A rotary cone rock bit as set forth in claim 1 wherein said sintered powder compact has a hardness of HRc 30 to 40 or equivalent in other scales.

12. A rotary cone rock bit comprising:
    a rock bit body,
    at least one leg depending from said body,
    a journal shaft of said leg,
    a roller cutter cone adapted to be rotatively secured to said journal shaft, and
    a bearing material disposed between said journal and said roller cutter, said bearing material comprising a sintered powder compact, said sintered powder compact comprising 9–15 wt. % Ni, 5–10 wt. % Sn, the balance substantially copper.

13. A rotary cone rock bit according to claim 12 wherein said sintered powder compact additionally contains up to 5 wt. % of a strengthener.

14. A rotary cone rock bit comprising:
    a rock bit body,
    at least one leg depending from said body,
    a journal shaft of said leg,
    a roller cutter cone adapted to be rotatively secured to said journal shaft, and
    a bearing material disposed between said journal and said roller cutter, said bearing material being formed in a cylindrical ring, said ring being interference fitted within a complementary cavity formed in said roller cutter, an inner surface of said cylindrical ring forming a bearing surface for said journal shaft, said journal shaft forms a circumferential groove in a surface formed by said shaft, said groove being transverse to an axis of said shaft, a portion of said groove being filled with a metal harder than the metal of said shaft, said hard metal portion acting as a bearing when said cone bearing surface is loaded against said hard metal surface during rock bit operation, said bearing material comprising a sintered powder compact, said sintered powder compact comprising:
    a copper base alloy,
    about 9–15 wt. % of a transition metal soluble in copper and forming a solid solution therewith, and
    about 5–10 wt. % of at least one metalloid of limited solid solubility in copper capable of forming a stable compound with the transition metal and/or with copper, which is substantially insoluble in solid solution with copper.

15. A rotary cone rock bit comprising:
    a rock bit body,
    at least one leg depending from said body, a journal shaft of said leg, a roller cutter cone adapted to be rotatively secured to said journal shaft, and a bearing material disposed between said journal and said roller cutter, said bearing material being formed as a cylindrical ring, said ring being so dimensioned to float between said journal shaft and said roller cutter, the inner and outer surfaces of said floating ring serve as bearing surfaces adjacent complementary bearing surfaces formed by said journal and said roller cutter, said bearing material comprising a sintered powder compact, said sintered powder compact comprising:

a copper base alloy, about 9–15 wt. % of a transition metal soluble in copper and forming a solid solution therewith, and about 5–10 wt. % of at least one metalloid of limited solid solubility in copper capable of forming a stable compound with the transition metal and/or with copper, which is substantially insoluble in solid solution with copper.

16. A rotary cone rock bit as set forth in claim 15 wherein the inner bearing surface of said floating ring bears against said journal shaft, said shaft forming a circumferential groove in said shaft bearing surface, said groove being transverse to an axis of said shaft, a portion of said groove being filled with a metal harder than the metal of said shaft, said hard metal portion acting as a bearing when said roller cutter and said floating ring is loaded against said hard metal surface during rock bit operation.

17. A sealed bearing rotary cone rock bit comprising:

a metal rock bit body, at least one leg depending from said body, a journal shaft depending from said leg, a metal roller cutter cone adapted to be rotatively secured to said journal shaft, and a bearing material comprising a sintered compact comprising a copper base alloy in the form of Cu-M-X, wherein "M" is a transition metal, from the group consisting of Fe, Co, Ni, Cr, present in the range of about 5–20 wt. %, which is readily soluble in the copper matrix and forms a solid solution with copper, and "X" is a metalloid comprising at least one of Sb, As, S, Sn, Se, Te, Be and P, present in the range of about 0.5–10 wt. % and which has a limited solid solubility in copper but forms stable compounds with the transition metal M, said bearing material being formed as a cylindrical ring, said ring being so dimensioned to float between said journal shaft and said roller cutter cone, the inner and outer surfaces of said floating ring serving as bearing surfaces adjacent complementary bearing surfaces formed by said journal and said roller cutter.

18. A sealed bearing rotary cone rock bit according to claim 17 wherein said bearing material additionally contains a strengthener comprising at least one of Zr, Mo, Nb and Al.

19. A sealed bearing rotary cone rock bit according to claim 18 wherein said strengthener is present in an amount of 0.1–0.8 wt. % and the total addition of strengthener is not more than 5 wt. % of the sintered compact.

20. A sealed bearing rotary cone rock bit as set forth in claim 17 wherein said sealed bearing rotary cone rock bit is a three-cone rock bit.

21. A sealed bearing rotary cone rock bit according to claim 17 wherein said bearing material has a hardness of HRc 30 to 40 or equivalent in other scales.

22. A rotary cone rock bit comprising:

a rock bit body, at least one leg depending from said body, a journal shaft of said leg, a roller cutter cone adapted to be rotatively secured to said journal shaft, and a bearing material disposed between said journal and said roller cutter, said bearing material comprising a sintered powder compact having a hardness of HRc of 30 to 40 or equivalent in other scales, said sintered powder compact comprising:

a copper base alloy, about 9–15 wt. % of a transition metal soluble in copper and forming a solid solution therewith, and about 5–10 wt. % of at least one metalloid of limited solid solubility in copper capable of forming a stable compound with the transition metal and/or with copper, which is substantially insoluble in solid solution with copper.

* * * * *